J. T. BAKER,

Assignor to M. CONRAD.

SHAFT PROP FOR BUGGIES.

No. 10,079. Reissued Apr. 11, 1882.

WITNESSES—
F. W. Adams.
W. C. Adams.

INVENTOR—
James T. Baker
per W. E. Dayton
Attorney.

UNITED STATES PATENT OFFICE.

JAMES T. BAKER, OF FAIRFIELD, ASSIGNOR TO MARTIN CONRAD, OF CHICAGO, ILLINOIS.

SHAFT-PROP FOR BUGGIES.

SPECIFICATION forming part of Reissued Letters Patent No. 10,079, dated April 11, 1882.

Original No. 222,227, dated December 2, 1879. Application for reissue filed December 3, 1881.

*To all whom it may concern:*

Be it known that I, JAMES T. BAKER, of Fairfield, in the county of Wayne and State of Illinois, have invented certain new and useful Improvements in Wagon Thill and Tongue Supports; and I do hereby declare that the following is a full, clear, and exact description thereof, reference being had to the accompanying drawings, and to the letters of reference marked thereon, which form a part of this specification.

This invention relates to devices permanently applied to wagons for the support of the thills or tongue, but contrived to disengage so that the tongue or thills may be lowered to the ground.

The object of the invention is to provide a construction whereby the engagement and disengagement of the operative parts may be automatically effected by vertical movements of the tongue or thills, and to this end consists in the matters hereinafter set forth and claimed.

Figure 1:
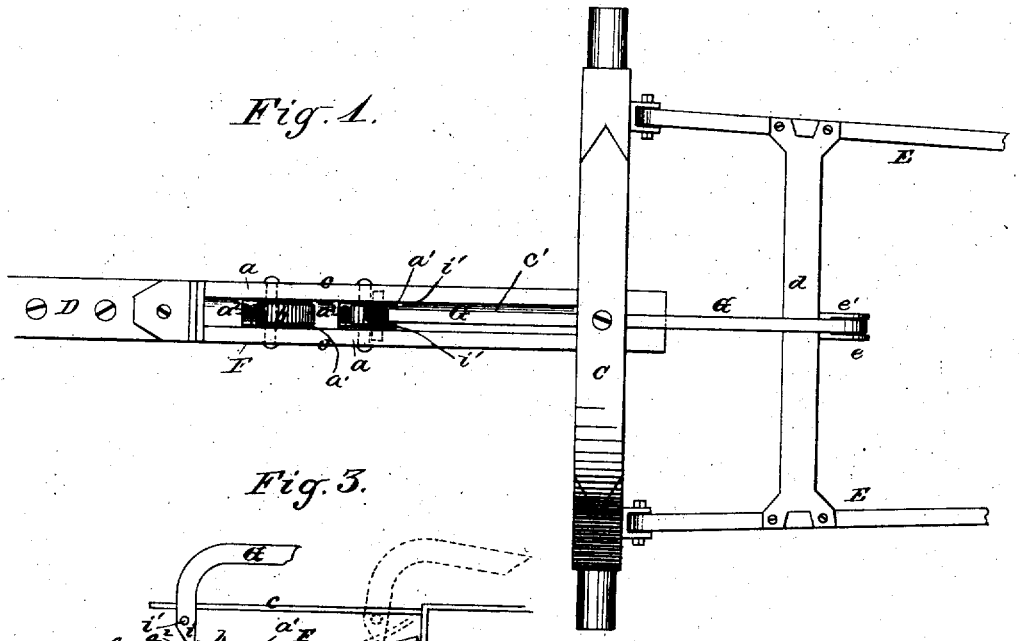
Figure 3:
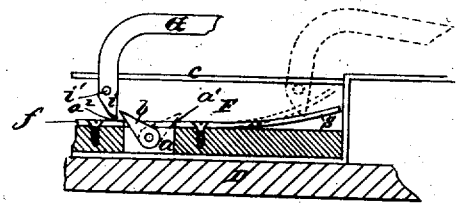
Figure 2:
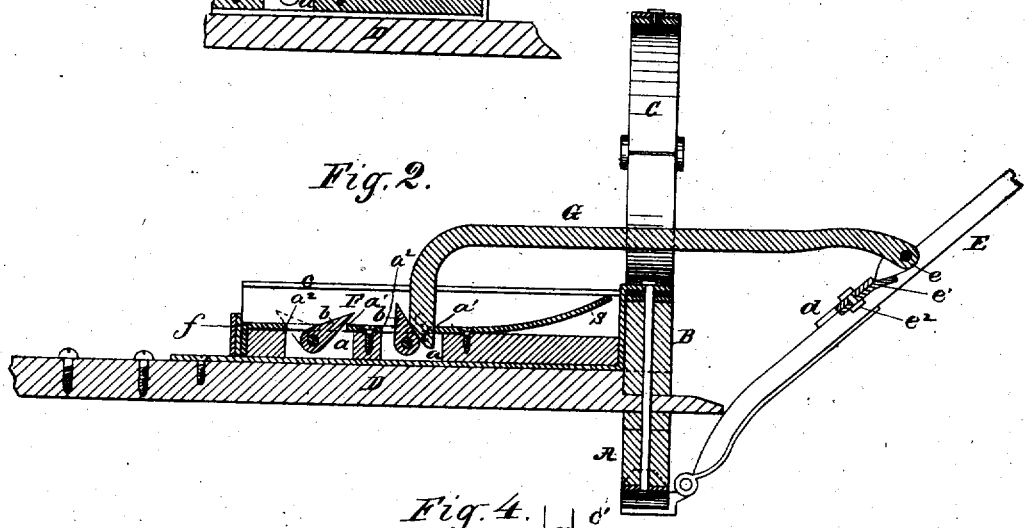
Figure 4:
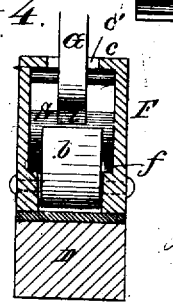

In the drawings, Figure 1 is a plan view of my invention applied to a one-horse buggy. Fig. 2 is a vertical section taken longitudinally through the reach D of Fig. 1. Fig. 3 is a fragmentary view of parts shown in Fig. 2. Fig. 4 is a transverse vertical section through the reach, looking from rear to front, and showing the rear end of the bar G drawn forward in the position occupied thereby when the thills are lowered to the ground.

A is the forward axle of a buggy. B is the head-block. C is the front spring. D is the reach, and E the thills or pole.

The appliances embraced in my invention consist of two principal parts—one pivotally attached to the thills or pole and movable therewith and the other affixed to the gear. As here illustrated, the latter consists of a metal box, F, fastened to the top of the reach D at its front end, and the former of a bar or rod, G, pivoted at $e$ to the branched plate $e'$, which in turn is pivoted by the pin $e^2$ to the cross-bar $d$ of the thills E. Said bar G is curved downward or of hooked form at its rear free end, as shown. The box F has its inner bottom, $f$, elevated a short distance above the reach on which said box rests, and is provided with one or more apertures or recesses, $a$, which give shoulders $a'$, with which the rear end, $i$, of the bar G may engage when the thills to which said bar is applied are raised from the ground. In the recess $a$ is pivoted a tumbler, $b$, which may freely swing over on its pivot against either the front or rear end of the recess in which it is located, and which in either position projects above the inner bottom, $f$, of the box F. Said tumbler is preferably so placed in the recess $a$ that while the end $i$ of the bar G may be admitted to said recess in front of the tumbler sufficiently to engage with the shoulder $a'$, as shown in Fig. 2, the said end of the bar G will strike the tumbler when it enters the recesses behind it. The sides of the box F are provided with the inwardly-directed longitudinal flanges $c$ $c$, between which flanges is a slot, $c'$, through which the end of the bar G sets down into the box, and may slide backward and forward. With this construction of the part F said bar G is provided with a transverse pin, $i'$, which projects laterally beneath the flanges $c$ $c$ of the box, and prevents the end $i$ of the bar from being lifted out of the slot $c'$. Said pin may also limit the extent to which the end $i$ of the bar G may drop into the recess $a$ by striking upon the bottom $f$ of the box at the sides of said recess $a$.

In a buggy having the support applied thereto for the purpose of sustaining the thills or pole at a considerable elevation when not in use, as here indicated, a flat inclined spring, S, is provided in the front end of the box F, as seen in Fig. 2, upon which the lower end, $i$, of the bar G rides when the thills are lowered to the ground or to the level required when the buggy is hitched to the horse. By the action of the spring S the pin $i'$ is borne firmly upward against the under surface of the flanges $c$ $c$, and the end of the bar G is thereby held from rattling when the vehicle is in motion. The front end of the bar G being pivoted at $e$ to the plate $e'$, and said plate being pivoted at $e^2$ to the cross-bar $d$, free lateral motion of the thills is practicable when either raised or lowered.

The operation of the parts described in effecting the engagement and disengagement of the part G with the shoulder $a'$ of the part F is as follows: Suppose the thills to be resting on the ground and the bar G to be therefore drawn forward, say, to the position shown in dotted lines of Fig. 3. The thills are locked in a raised position by taking hold of the thills and lifting them until the end *i* of the bar G passes and drops behind the shoulder *a'*. If, when this is to be done, the tumbler *b* stands tilted forward, as shown by dotted lines in Fig. 3, the end of the bar G strikes the projecting end of the tumbler and swings it backward out of the way, so that this position of the tumbler in no way prevents the engagement of the bar G with the shoulder *a'*. When it is desired to lower the thills the latter are again taken hold of, and are first further lifted until the tumbler *b* is thrown backward over against the rear end. $a^2$, of the recess *a* and until the end *i* of the bar G, sliding backward upon the tumbler, has passed the same, as shown by full lines in Fig. 3. The thills are then lowered or let fall, by which means the bar G is drawn forward. In this movement of the bar its end *i* catches the tumbler and tilts it forward against the shoulder *a'*, so as to form a bridge, over which the bar passes without again engaging the shoulder *a'*. Thus it will be seen both the locking and unlocking of the engaging parts G and F are wholly accomplished by a vertical movement of the thills or tongue. To facilitate the movement of the bar G backward over the tumbler or bridging-piece *b*, the end *i* of the bar is beveled on its rear face, as shown.

If desired, two or more recesses and tumblers may be provided, as shown in Figs. 1 and 2, whereby the thills or tongue may be supported at different elevations, and it is obvious that the part F may be elsewhere attached to the relatively stationary wagon-gear than to the reach.

I claim as my invention—

1. In a wagon tongue or thill support, the combination, with the tongue or thills and relatively stationary gear, of a part, F, provided with a shoulder, *a'*, a part, G, adapted to engage said shoulder, and a movable part, *b*, arranged to carry the part G over the shoulder *a'* by an upward and downward movement of the tongue or thills, substantially as described.

2. In a wagon tongue or thill support, the combination, with the vertically-movable thills or tongue and relatively stationary gear of the wagon, of a part, F, provided with a shoulder, *a'*, and a movable piece, *b*, arranged to bridge said shoulder, a part, G, adapted to engage said shoulders and also to ride said bridging-piece, whereby the locking parts may be automatically engaged and disengaged by a vertical movement of the tongue, substantially as described.

3. In a tongue or thill support, the combination, with the vertically-movable thills and relatively fixed gear, of the box F, having the slot *c'*, flanges *c*, and recess *a*, provided with tumblers *b* of the bar G, pivoted to the thills or tongue, and its end *i*, adapted to engage in the recess *a* and provided with the projecting arm *i'*, substantially as described.

4. The combination, with the thills or pole and gear of the box F, having slots *c'*, flanges *c*, recesses *a*, tumblers *b*, and spring S, of the bar G, pivoted to the thills and provided with arms *i'*, substantially as described, and for the purposes specified.

In testimony that I claim the foregoing as my invention I affix my signature in presence of two witnesses.

JAMES T. BAKER.

Witnesses:
M. E. DAYTON,
WILLIAM M. STANLEY.